United States Patent [19]

Hentschel

[11] 3,996,480
[45] Dec. 7, 1976

[54] SAMPLE AND HOLD-CIRCUIT ARRANGEMENT FOR AN ELECTRICAL MOTOR SIMULATOR OF AN ELECTRONIC MOTOR PROTECTION RELAY

[75] Inventor: Michael Hentschel, Hannover, Germany

[73] Assignee: Sprecher & Schuh AG, Aarau, Switzerland

[22] Filed: Sept. 30, 1975

[21] Appl. No.: 618,211

[30] Foreign Application Priority Data

Oct. 1, 1974 Switzerland .................. 13219/74

[52] U.S. Cl. .................. 307/235 C; 235/184; 328/151; 324/158 MG
[51] Int. Cl.$^2$ ...................... G11C 27/02
[58] Field of Search ....... 307/235 B, 235 C, 235 K; 328/146, 147, 151; 324/158 R, 158 MG; 235/184, 185

[56] References Cited
UNITED STATES PATENTS

| | | |
|---|---|---|
| 3,750,036 | 7/1973 | Burrows et al. ............... 307/235 B |
| 3,786,242 | 1/1974 | Brooks ........................ 328/151 X |

OTHER PUBLICATIONS

"Applications for fast slewing OP AMPS", by W. Hearn, Electronic Products Magazine, June 21, 1971, p. 54.

*Primary Examiner*—John Zazworsky
*Attorney, Agent, or Firm*—Haseltine, Lake & Waters

[57] ABSTRACT

A sample and hold-circuit arrangement for an electrical motor simulator of an electronic motor protection relay wherein the motor simulator is charged by a charging current source with clocked charging currents through a main or primary switch controlled by clock signals. A sample and hold-amplifier containing a storage capacitor and an electronic switching device are connected through the main switch at the motor simulator and the electronic switching device is controlled by the clock signals. The sample and hold-amplifier containing the storage capacitor is electrically connected during the charging cycles to the motor simulator for recharging of the storage capacitor to the charging voltage of the motor simulator and during the rest cycles is electrically disconnected from the motor simulator for the control or triggering of the sample and hold-amplifier by the charging voltage of the recharged storage capacitor.

11 Claims, 3 Drawing Figures

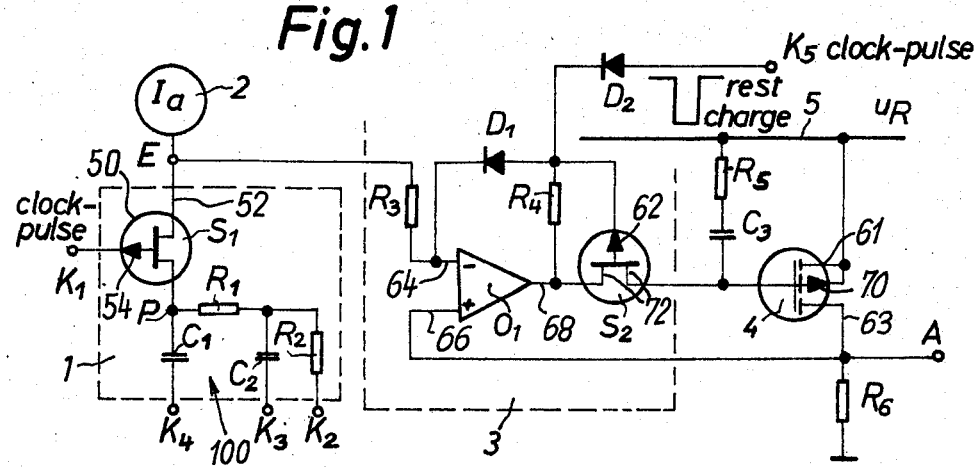
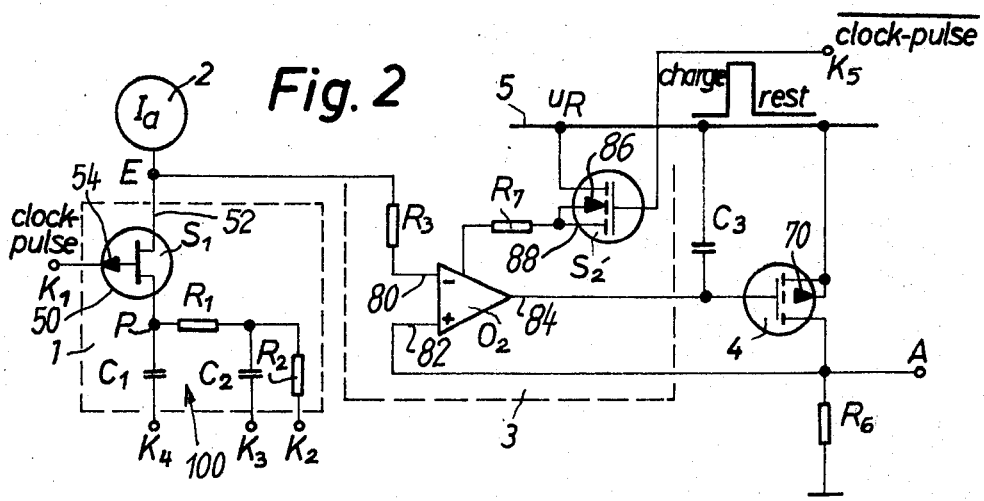
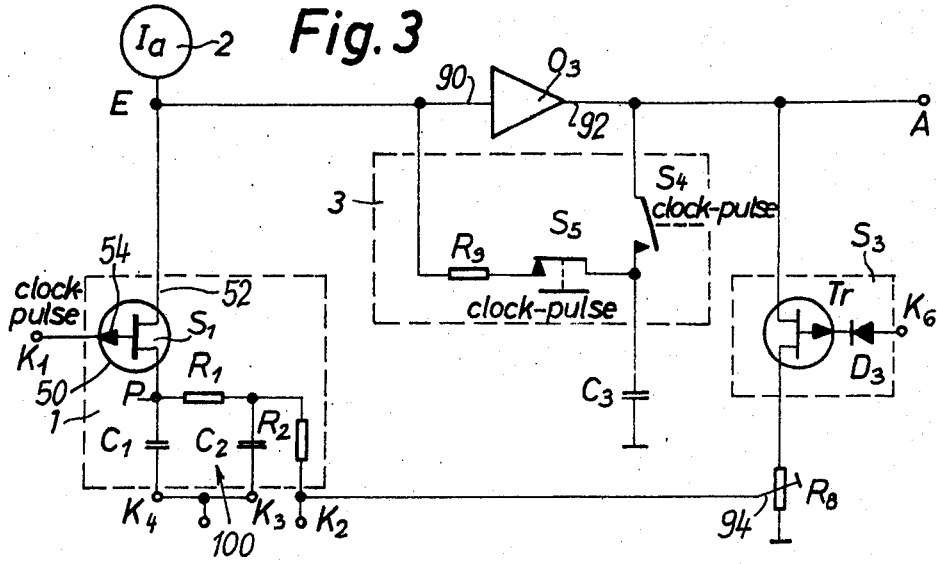

SAMPLE AND HOLD-CIRCUIT ARRANGEMENT FOR AN ELECTRICAL MOTOR SIMULATOR OF AN ELECTRONIC MOTOR PROTECTION RELAY

BACKGROUND OF THE INVENTION

The present invention relates to a new and improved construction of sample and hold-circuit arrangement for an electrical motor simulator in an electronic motor protection or protective relay wherein the motor simulator is charged with a clocked charging current by a charging current source through a main or primary switch controlled by clock signals.

In an electronic motor protection relay the charging voltage of an electrical motor simulator composed of capacitors and resistors is compared with a comparison voltage characteristic of the permissible motor threshold or boundary temperature in order to obtain a control signal for cutting-off the motor current in the presence of impermissibly high heating-up of the motor. The electrical simulation of the thermal behavior of a three-phase motor requires large time-constants which cannot be advantageously realized by utilizing extremely high-ohm resistors and very weak charging currents, but rather by supplying the motor simulator with clocked charging current. If there is taken into account the different thermal behavior of a running motor and a stationary motor or of a motor which is to be considered as stationary, then as far as the motor simulator is concerned there also must be provided appropriately different time-constants. To that end there must be present in the motor simulator switching means which can be turned-on and turned-off for increasing the virtual impedance of the resistance network of the motor simulator, as such has been described in detail for instance in Swiss Pat. No. 540,587, the disclosure of which is incorporated herein by reference. Thus, for instance, the time-constant of the motor simulator is increased in that its resistance network is connected by means of its low or bottom end at a fraction of the charging voltage which can be tapped-off by means of an impedance converter and a voltage divider. In both cases, that is to say, for the derivation of a cut-off control signal and for influencing the time-constants of the motor simulator there is accordingly required in the electronic motor protection relay a circuit arrangement which in an appropriate manner makes available a voltage which is equal to, or proportional to the charging voltage of the motor simulator.

SUMMARY OF THE INVENTION

Hence, it is a primary object of the present invention to provide a new and improved construction of a sample and hold-circuit arrangement (also sometimes referred to as a sampling storage-circuit arrangement) for an electrical motor simulator in an electronic motor protection relay which reliably satisfies the aforementioned needs existing in the art.

Another and more specific object of the present invention aims at the provision of a new and improved construction of a circuit arrangement for the indication of the charging state of a motor simulator supplied with a clocked charging current which, while having a relatively simple construction, reliably delivers an output voltage corresponding to the charging voltage of the motor simulator at a satisfactory accuracy both for the derivation of a cut-off control signal, as well as for changing the time-constants of the motor simulator.

Now in order to implement these and still further objects of the invention, which will become more readily apparent as the description proceeds, the circuit arrangement of this development is manifested by the features that a sample and hold-amplifier or sampling storage-amplifier containing a storage capacitor and an electronic switching device are connected through the primary or main switch to the motor simulator, and the electronic switching device is controlled by the clock signals. The sample and hold-amplifier having the storage capacitor is electrically connected during the charging cycles to the motor simulator for recharging of the storage capacitor to the charging voltage of the motor simulator, and in the rest cycles is electrically disconnected from the motor simulator for the control or triggering of the sample and hold-amplifier by the charging voltage of the recharged storage capacitor.

The electronic switching device thus preferably contains an operational amplifier and an electronic switch controlled by the clock signals, one input of the operational amplifier being connected via the main switch to the motor simulator, and at the other input of the operational amplifier there can be applied the output voltage of the sample and hold-amplifier. Furthermore, by means of the electronic switch there can be applied to the storage capacitor and the control input of the sample and hold-amplifier the output signal of the operational amplifier only during the charging cycles by means of which signal the storage capacitor is recharged up to a voltage value where the output voltage of the sample and hold-amplifier is equal to the charging voltage of the motor simulator. As the operational amplifier there can be used a differential amplifier of conventional construction, the output of which is connected by means of the electronic switch to the storage capacitor and to the control input of the sample and hold-amplifier. The electronic switch controlled by the clock signals then advantageously consists of a P-channel-field-effect transistor, at the gate of which there are applied the clock signals through a diode and such a gate can be connected via a diode to the inverting input of the operational amplifier, and by a resistor to the output of the operational amplifier in order to maintain the operational amplifier-output at negative potential during the rest cycles. The sample and hold-amplifier advantageously consists of an enhancement-type or enriched-MOSFET (metal oxide field-effect transistor), to the gate of which there can be connected the output of the operational amplifier via the electronic switch and the storage capacitor, and the storage capacitor and the source electrode of the MOSFET can be connected to the same constant reference voltage. It is recommended to apply the reference voltage at the storage capacitor through a resistor and by appropriate design to provide for the arrangement a time-constant which is small in relation to the duration of the charging cycle.

In the electronic switching device there also can be used as the operational amplifier a so-called "OTA" (operational-transconductance-amplifier), at the bias current circuit of which there can be connected the electronic switch controlled by the clock signals, and the output of which can be connected to the storage capacitor and the control input of the sample and hold-amplifier. Moreover, a respective enhancement-type MOSFET can be again advantageously used as the electronic switch and as the sample and hold-amplifier.

In an electronic motor protection relay wherein, as mentioned, there is applied at the low or bottom end of the resistance network for a larger time-constant of the motor simulator a fraction of the charging voltage of the motor simulator through an impedance converter and a voltage divider, the impedance converter itself can be advantageously used as the sample and hold-amplifier, and the electronic switching device can be constructed for connection of the storage capacitor during the charging cycles at the output of the impedance converter, and during the rest cycles at the input of the impedance converter. To this end the electronic switching device can contain two switches controlled by the clock signals, of which the one connects the storage capacitor to the output of the impedance converter, and the other the storage capacitor via a resistor to the input of the impedance converter, and during the charging cycles in each case the first switch is conductive, and the second switch is non-conductive, and during the rest cycles the switching states of the switches are reversed.

BRIEF DESCRIPTION OF THE DRAWINGS

The invention will be better understood and additional objects to those set forth above will become apparent when consideration is given to the following detailed description thereof. Such description makes reference to the annexed drawing wherein:

FIG. 1 is a circuit diagram of a circuit arrangement for the charging state indication wherein for a sample and hold-amplifier and a storage capacitor there is provided a switching device having a differential amplifier and clock signal controlled-electronic switch;

FIG. 2 is a circuit diagram of a somewhat modified circuit arrangement with respect to the embodiment of FIG. 1 and embodying a switching device containing an "OTA" (operational-transconductance-amplifier) for the sample and hold-amplifier and storage capacitor; and FIG. 3 is a circuit diagram of a circuit arrangement for the charging state indication having an impedance converter as the sample and hold-amplifier.

DETAILED DESCRIPTION OF THE PREFERRED EMBODIMENTS

Describing now the drawing, with the subsequently discussed exemplary embodiment of the invention the motor simulator 100 consists of two RC-elements $R_1$, $C_1$, $R_2$, $C_2$, which together with a field-effect transistor 50 serving as the electronic switch $S_1$ are cast into a block 1 by means of an electrically insulating mass in order to provide protection against the effects of moisture or the like. The block 1 has a number of external terminals or connections E, $K_1$, $K_2$, $K_3$, $K_4$, wherein the one connection or terminal E is electrically connected to the drain electrode 52 of the field-effect transistor 50 and to the terminal $K_1$ connected to the gate 54. To the terminal E there is connected a charging current source 2, and at the terminal $K_1$ there are applied clock pulses or signals, so that during the charging cycles a charging current $I_a$ flows through the field-effect transistor 50 which is switched into its conductive state by the motor simulator 100. The last resistor $R_2$ of the resistance network of the motor simulator 100 is connected to the terminal $K_2$, and both of the capacitors $C_1$ and $C_2$ are connected to the terminals $K_4$ and $K_3$, as shown. This type of motor simulator has been described in detail in the aforementioned Swiss Pat. No. 540,587.

At the terminal E which is connected to the electronic switch $S_1$, hereinafter generally designated as the main or primary switch, and which terminal E is furthermore connected to the charging current source 2, there is connected the sample and and hold-circuit arrangement to the electrical motor simulator, and which contains the sample and hold-amplifier, or sampling storage-amplifier 4, the storage capacitor $C_3$, and the electronic switching device 3.

With the circuit arrangement illustrated in FIG. 1 the sample and hold-amplifier 4 consists of an enhancement-MOSFET of the P-channel type, the source 61 and substrate of which are coupled to a line or conductor 5, carrying a constant positive reference voltage $U_R$, and the drain 63 of which is connected to ground through a resistor $R_6$, as shown. At the output terminal A, which is connected in circuit with the resistor $R_6$, there is tapped-off the output voltage of the circuit arrangement as the control signal for the electronic motor protection relay. The electronic switching device 3 essentially contains an operational amplifier $O_1$ and an electronic switch $S_2$ which is controlled by the clock signals. In this case the electronic switch $S_2$ is constituted by a P-channel-field-effect transistor, at the gate 62 of which there are applied the clock pulses through the terminal or connection $K_5$ and a diode $E_2$. In the case of the operational amplifier $O_1$ the inverting input 64 is connected through the a resistor $R_3$ to the input terminal E of the block 1, and at the non-inverting input 66 there is applied the output voltage which is tapped-off from the resistor $R_6$. The drain-source-path 72 of the field-effect transistor $S_2$ connects the output 68 of the operational amplifier $O_1$ to the gate 70 of the MOSFET serving as the sample and hold-amplifier 4. The storage capacitor $C_3$ is connected at one terminal to the gate 70 of the MOSFET and at its other terminal via a resistor $R_5$ to the conductor or line 5 carrying the reference voltage $U_R$. Moreover, in the circuit arrangement of FIG. 1 the gate 62 of the field-effect transistor $S_2$ is connected via a diode $D_1$ to the inverting input 64 of the operational amplifier $O_1$, and via a resistor $R_4$ to its output 68.

The electronic switch $S_2$ of the switching device 3 is controlled by the same clock pulses as the main or primary switch $S_1$ of the motor simulator block 1. By means of a charging clock pulse or signal both switches $S_1$ and $S_2$ are switched into their conductive state (Sample). At the inverting input 64 of the operational amplifier $O_1$ there is then applied the charging voltage from the circuit point or junction P of the motor simulator, and the storage capacitor $C_3$ recharges for such length of time until the input voltage of the terminal or connection E, i.e. the charging voltage of the motor simulator, coincides with the output voltage at the output terminal A. In the rest cycle both of the switches $S_1$ and $S_2$ are non-conductive (Hold) and the MOSFET (sample and hold-amplifier 4) is triggered by the charging voltage of the storage capacitor $C_3$. Since during the rest cycle, with the field-effect transistor $S_2$ in its non-conductive state, a further recharging of the storage capacitor $C_3$ can then only take place by means of the very small and negligible leakage currents, the output voltage remains practically constant for the duration of the rest cycle at the input voltage peak present at the end of the charging cycle. On the other hand, the output of the operational amplifier $O_1$ during the rest cycle assumes an undefined potential, so that at the start of the next following charging cycle a certain output phase or portion must be passed through, i.e. during each charging cycle there occurs a relatively pronounced equalization operation, and the convergence to the terminal or final value of the voltage occurs according to an exponential function (e-function). In order for such a compensation operation not to build up into an oscillation, the output 68 of the operational amplifier $O_1$ is switched to a negative potential during the rest cycle by triggering the inverting input 64 of the operational amplifier $O_1$ via the diode $D_1$ in order to maintain the output voltage phase or portion of the amplifier $O_1$ as low as possible at the start of the following charging cycle. Due to this negative potential at the output 68 of the operational amplifier $O_1$ there is also positively prevented a possible switching-through of the field-effect transistor (switch $S_2$) due to drift of the output voltage during the rest cycle.

The resistor $R_5$ which is connected in circuit with the storage capacitor $C_3$ serves for the stabilization of the regulation loop. By direct application of the reference voltage $U_R$ to the storage capacitor $C_3$ there would occur oscillations, since the voltage attenuation by virtue of the RC-element formed by the forward resistance of the field-effect transistor (switch $S_2$) and the storage capacitor $C_3$ is at least compensated by the MOSFET sample and hold-amplifier 4 having a gain of approximately ten; the additional phase shift in the critical range, however, is greater than 45°. By the introduction of the resistor $R_5$ which has a sufficient amount of resistance, an additional phase shift in the critical frequency range is suppressed, so that the circuit arrangement functions in a stable manner during the charging cycles.

It has already been mentioned that during the charging cycle the matching of the output voltage with the input voltage occurs in accordance with an e-function. Since leakage currents cannot be avoided, a large time-constant of the arrangement would induce additional errors, since an exact matching of the output voltage with the input voltage, i.e. with the charging voltage of the motor simulator would no longer be possible during the short duration of the charging cycle. In order to prevent such additional errors it is therefore necessary that the arrangement have a small time-constant in relation to the duration of the charging cycle.

The electronic switching device 3 also could contain as the switch $S_2$ a N-channel-field-effect transistor. At the terminal $K_5$ there then must be applied the inverted cycles of the clock pulse, and the diodes $D_1$ and $D_2$ must be connected in reversed polarity. The use of a N-channel-field-effect transistor is, however, less favorable, since, for instance, for the charging cycle there is lost the optimum starting condition of the operational amplifier $O_1$, which has been previously explained with respect to a P-channel-field-effect transistor.

In FIG. 2 there is illustrated a circuit diagram of a somewhat modified version of circuit arrangement which in construction is simpler than that of the circuit arrangement of FIG. 1. With this embodiment the electronic switching device 3 contains a so-called OTA (operational-transconductance-amplifier), i.e. an operational amplifier $O_2$ of special construction. The OTA possesses a current output, and is turned-on and turned-off by means of a bias current circuit. The inverting input 80 of this operational amplifier $O_2$ is again connected by means of a resistor $R_3$ to the input terminal E of the motor simulator or simulation block 1, and there is applied to the non-inverting input 82 the output voltage. The output 84 of the operational amplifier $O_2$ is connected to the gate 70 of the MOSFET serving as the sample and hold-amplifier 4. In the bias current circuit of the operational amplifier $O_2$ there is connected as the electronic switch $S'_2$ a MOSFET of the N-channel type, at the gate 86 of which there is applied through the the terminal $K_5$ the inverted cycles of the clock pulses for the main switch $S_1$. The source 88 and substrate of such a MOSFET are connected through a resistor $R_7$ to the bias input of the operational amplifier $O_2$. The MOSFET (switch $S'_2$) is switched into its conductive state by the charging cycle, and therefore the OTA-operational amplifier $O_2$ is activated, so that by means of its output signal the storage capacitor $C_3$ is recharged until the output voltage at the sample and hold-amplifier 4 is equal to the input voltage of the operational amplifier $O_2$. During the rest cycle the switch $S'_2$ is non-conductive, so that the OTA-operational amplifier $O_2$ cannot receive any bias current, and its output current is equal to zero. In the rest cycle the storage capacitor $C_3$ can only recharge by means of the very small leakage current of the OTA-operational amplifier $O_2$, so that in the rest cycle the output voltage of the circuit arrangement remains practically constant. Owing to the current output of the OTA-operational amplifier there occurs during the charging cycle an approximately linear rise of the output voltage to the voltage value of the input voltage, and since also during the rest cycle the output signal of the OTA-operational amplifier is clearly defined, in this case there do not arise the side effects which have been described previously when using a conventional operational amplifier in the switching device 3. This variation of circuitry is therefore particularly advantageous.

FIG. 3 illustrates a circuit arrangement for the indication of the charging state of a motor simulator 100 wherein, in accordance with the previously mentioned Swiss Pat. No. 540,587 for increasing the virtual impedance of the resistance network $R_1$, $R_2$, there is provided an impedance converter $O_3$, the input 90 of which is connected to the input terminal E of the motor simulator block 1, and the output 92 of which is at, for instance, zero potential through the source-drain-path of a field-effect transistor Tr, and a voltage divider $R_8$. The tap 94 of the voltage divider $R_8$ is connected to the base point or low end of the resistance network $R_1$, $R_2$ of the motor simulator 100. The field-effect transistor Tr is controlled or triggered through the terminal $K_6$ and the diode $D_3$ by means of the control signals, so that with the motor running, it is in its non-conductive or blocked state, and when the motor is at standstill such transistor is switched into its conductive state. The field-effect transistor Tr having a diode $D_3$ at the input accordingly forms a mode switch $S_3$. When the field-effect transistor Tr is rendered conductive, then a certain fraction or portion of the charging voltage at the circuit point P is applied via the voltage divider $R_8$ at the low end of the resistance network $R_1$, $R_2$, and thus the time-constant of the motor simulator is increased. The impedance converter $O_3$ which is already available in this case and used in the circuit arrangement for the indication of the charging state of the motor simulator 100, is simultaneously employed as the sample and hold-amplifier. The electronic switching device 3 contains two electronic switches $S_4$, and $S_5$ and a resistor $R_9$. The storage capacitor $C_3$ which is connected at one terminal to a constant reference potential, is connected at the other terminal by means of the one switch $S_4$ of the switching device 3 to the output of the impedance converter $O_3$, and by means of the other switch $S_5$ and the resistor $R_9$ to the input 90 of such an impedance converter $O_3$. The switches $S_4$ and $S_5$ are controlled by means of the clock pulse, which is applied via the terminal $K_1$ at the main or primary switch $S_1$, the switch $S_4$ functioning synchronously with the main switch $S_1$, and at the switch $S_5$ there are applied the inverted cycles of the clock pulse, so that the switch $S_5$ becomes non-conductive when the switch $S_4$ is conductive and vice-versa. During the charging cycle the main switch $S_1$ and the switch $S_4$ are conductive and the switch $S_5$ blocks, so that at the input 90 of the impedance converter $O_3$ there is applied the charging voltage from the circuit point of junction P of the motor simulator 100, and the storage capacitor $C_3$ is charged to the simulation voltage. During the following rest cycle the main switch $S_1$ and the switch $S_4$ are non-conductive, and the switch $S_5$ is switched into its conductive state, so that during this cycle the charging voltage of the storage capacitor $C_3$ appears at the input 90 of the impedance converter $O_3$, and at output A thereof there can be tapped-off the corresponding output voltage. In order to derive such as indication-circuit arrangement it is only necessary to equip the previously available motor simulator with the electronic switching device and the storage capacitor $C_3$.

While there are shown and described present preferred embodiments of the invention, it is to be distinctly understood that the invention is not limited thereto, but may be otherwise variously embodied and practiced within the scope of the following claims.

Accordingly, what is claimed is:

1. A sample and hold-circuit arrangement for an electric motor simulator of an electronic motor protection relay, comprising means defining a motor simulator, a charging current source in circuit with said motor simulator, a main switch controlled via clock pulses for charging the motor simulator from the charging current source with clocked current, said current having charging and rest cycles, a sample and hold-amplifier and a storage capacitor and an electronic switching device connected in circuit via the main switch to the motor simulator, the electronic switching device being controlled by the clock pulses, the sample and hold-amplifier and the storage capacitor being electrically connected during the charging cycles to the motor simulator for recharging the storage capacitor to the charging voltage of the motor simulator and in the rest cycles being electrically disconnected from the motor simulator for the sample and hold-amplifier to be triggerable by the charging voltage of the recharged storage capacitor.

2. The circuit arrangement as defined in claim 1, wherein the electronic switching device comprises an operational amplifier and an electronic switch controlled by the clock pulses, said operational amplifier having a first input and a second input and an output, the first input of the operational amplifier being electrically connected via the main switch with the motor simulator, the output voltage of the sample and hold-amplifier being applied to the second input of the operational amplifier, the output signal of the operational amplifier being applied by means of the electronic switch to the storage capacitor and a control input of the sample and hold-amplifier only during the charging cycles and by means of which the storage capacitor is recharged up to a voltage value at which the output voltage of the sample and hold-amplifier is equal to the charging voltage of the motor simulator.

3. The circuit arrangement as defined in claim 2, wherein the output of the operational amplifier is connected by means of the electronic switch with the storage capacitor and the control input of the sample and hold-amplifier.

4. The circuit arrangement as defined in claim 3, wherein the electronic switch comprises a P-channel-field-effect transistor having a gate, a diode in circuit with said field-effect transistor, the clock pulses being applied to the gate via said diode, and the output of the operational amplifier during the rest cycles is maintained at negative potential.

5. The circuit arrangement as defined in claim 4, wherein the gate of the P-channel-field-effect transistor is connected via the diode with the first input of the operational amplifier defining an inverting input and via a resistor with the output of the operational amplifier in order to maintain the operational amplifier-output at negative potential during the rest cycles.

6. The circuit arrangement as defined in claim 2, wherein the sample and hold-amplifier comprises an enhancement type-MOSFET having a gate, source and drain, the electronic switching device and the storage capacitor being connected in circuit with the gate of said MOSFET, the storage capacitor and the source of the MOSFET being connected in circuit with a means for supplying a reference voltage.

7. The circuit arrangement as defined in claim 6, wherein the storage capacitor is connected with the reference voltage through the agency of a resistor.

8. The circuit arrangement as defined in claim 7, wherein said circuit arrangement possesses a time-constant which is small in contrast to the duration of the charging cycle.

9. The circuit arrangement as defined in claim 2, wherein the operational amplifier comprises an operational-transconductance-amplifier having a bias current circuit with which there is connected the electronic switch controlled by the clock pulses and the output of which is connected with the storage capacitor and the control input of the sample and hold-amplifier.

10. The circuit arrangement as defined in claim 1, wherein the sample and hold-amplifier comprises an impedance converter having an input and an output, the storage capacitor being connected by means of the electronic switching device during the charging cycles with the output of the impedance converter and during the rest cycles at the input of the impedance converter.

11. The circuit arrangement as defined in claim 10, wherein the storage capacitor is connected with the output of the impedance converter by means of a first electronic switch and with the input of the impedance converter by means of a second electronic switch and a resistor, and during the charging cycles the first electronic switch is rendered conductive and the second electronic switch non-conductive and during the rest cycles the switching states of said two switches is reversed.

* * * * *